Nov. 10, 1936.  F. L. GAILEY  2,060,298
ADJUSTABLE SEAT BACK CUSHION
Filed Oct. 17, 1934  2 Sheets-Sheet 2
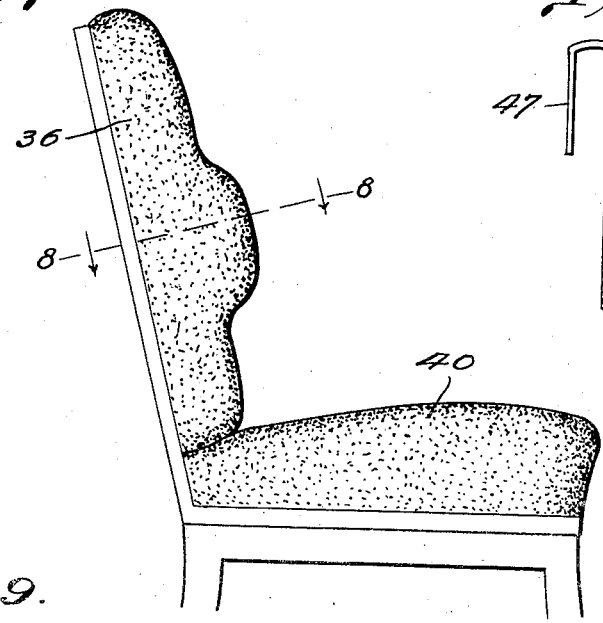
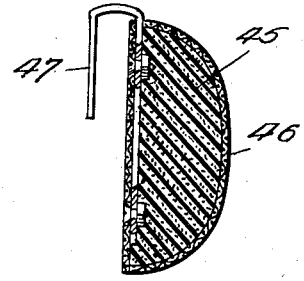
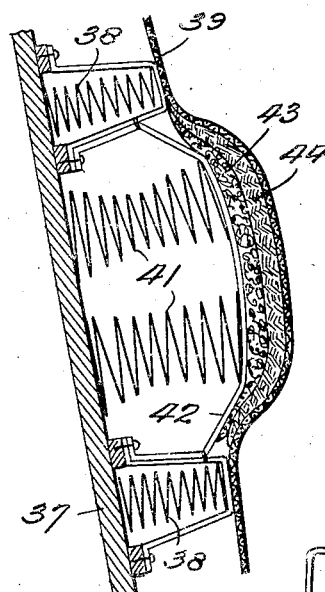
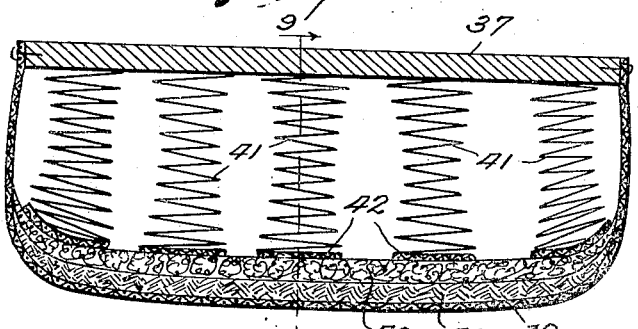
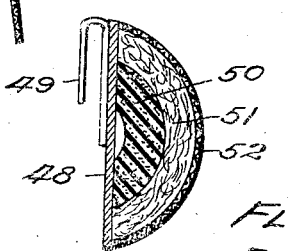
INVENTOR,
FLORENCE L. GAILEY.
By Martin P. Smith ATTY.

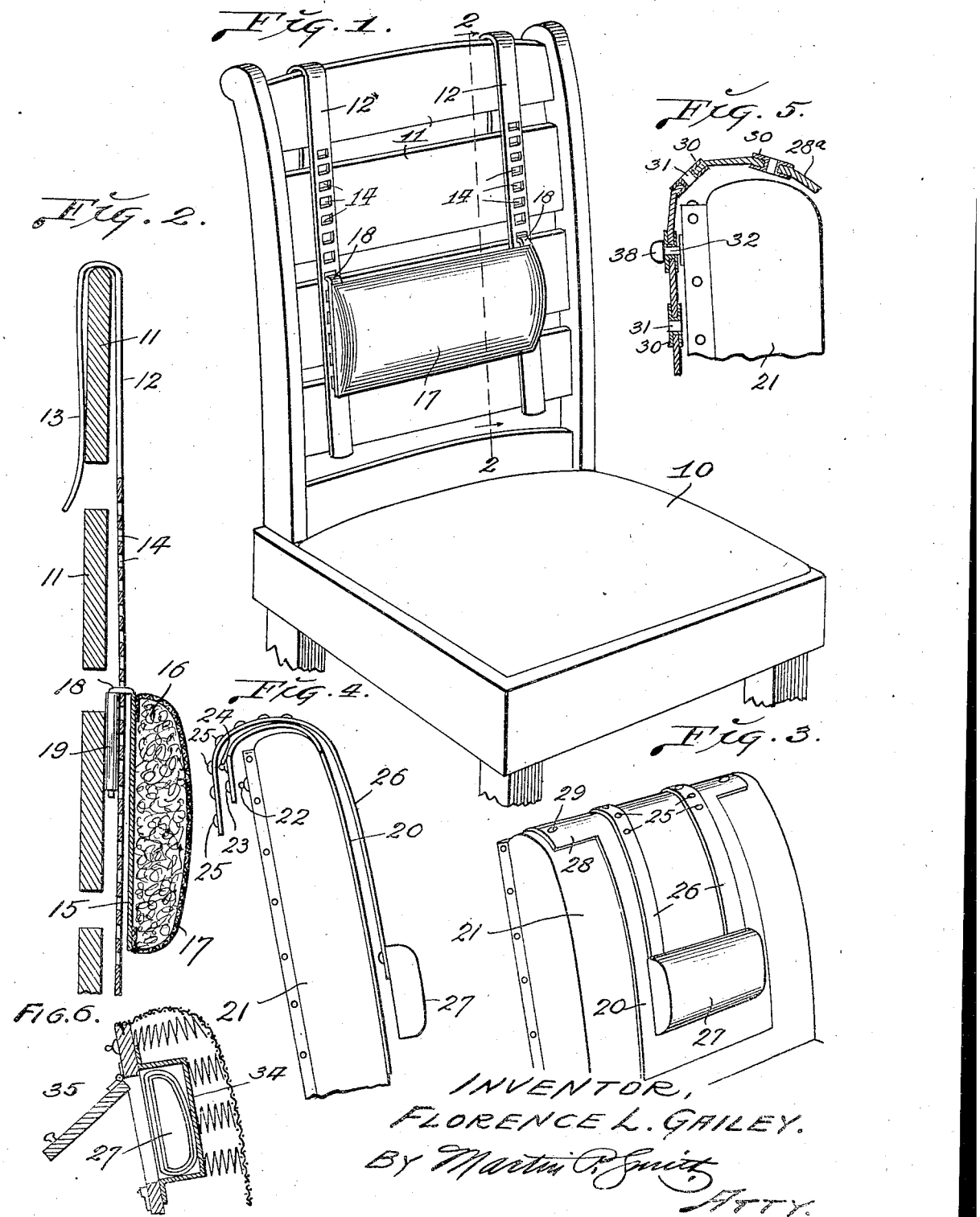

Patented Nov. 10, 1936

2,060,298

UNITED STATES PATENT OFFICE 2,060,298

ADJUSTABLE SEAT BACK CUSHION

Florence L. Gailey, Los Angeles, Calif.

Application October 17, 1934, Serial No. 748,629

2 Claims. (Cl. 155—182)

My invention relates to a back rest or cushion and the means for adjustably mounting same on the upright back portion of a chair, seat or bench.

The principal objects of my invention are, to provide an adjustable back rest or cushion that is relatively simple in construction, inexpensive of manufacture and which may be conveniently applied to the backs of chairs, benches, automobile seats and the like in order to add to the comfort of the occupant of the seat and to provide a cushioned support for the occupant's back so as to counteract fatigue, especially where a person occupies a seat for a considerable period of time.

My improved back rest or cushion and the means for adjustably mounting the same on a seat back, provides a convenient support for the back portion of the body of the occupant of the seat so as to enable the user to maintain the body in a comfortable upright position without undue and tiresome strains upon the spinal column and without undue pressure upon the vital organs of the body.

With the foregoing and other objects in view my invention consists in certain novel features of construction and arrangements of parts that will be hereinafter more fully described and claimed and illustrated in the accompanying drawings in which:

Fig. 1 is a perspective view of a chair and showing a back support or cushion adjustably applied to the back of the chair.

Fig. 2 is an enlarged vertical section taken on the line 2—2 of Fig. 1.

Fig. 3 is a modified form of the seat back cushion applied to an automobile seat.

Fig. 4 is an elevational view of the upright portion of an automobile seat and showing my improved back rest or cushion applied thereto.

Fig. 5 is a detail elevational view partly in section and showing a modified construction of adjustably mounting the back support upon an automobile seat back.

Fig. 6 is a detail section showing the upper portion of a vehicle seat back provided with a pocket for the reception of the back rest or cushion.

Fig. 7 is an elevational view of a motor vehicle seat and showing the back rest or cushion built into and forming a part of the back cushion.

Fig. 8 is an enlarged horizontal section taken on the line 8—8 of Fig. 7.

Fig. 9 is a vertical section taken on the line 9—9 of Fig. 8.

Fig. 10 is a vertical section of a modified form of the back rest or cushion that is detachably applied to chairs, seats or benches.

Fig. 11 is a vertical section showing a further modified form of the back rest or cushion that is applied to the backs of chairs or the like.

Referring by numerals to the accompanying drawings and particularly to the construction illustrated in Figs. 1 and 2, 10 designates a chair seat and 11 the panels of the chair back, which may be of conventional construction.

In order to adjustably mount the back support or cushion upon the chair back, I provide a pair of thin straps 12, preferably of metal having a certain degree of resiliency in order to conform to the contour of the seat back and the upper portions of these straps are bent rearwardly and downwardly to form hooks 13 that engage over the upper one of the chair back panels 11, thus firmly supporting the straps 12 in position on the front of the chair back.

Those portions of the straps 12 that overlie the front of the chair back are provided with apertures 14, which may be in the form of short horizontally disposed slots.

The back rest or cushion comprises a rear plate or panel 15 of wood or metal, on the face of which is a body 16 of resilient fibrous material, for instance, curled hair, and which latter is preferably treated with rubber to increase its resiliency and to increase its period of usefulness. This body of cushioning material is overlaid with a cover 17 of fabric or leather and the edges of which are suitably connected to the back plate or panel 15. In some instances light coil springs may be utilized in forming the back rest or cushion.

Secured to the upper edge of the back panel 15, adjacent to the end, are the upper portions of depending hooks 18 and which hooks may be inserted through the apertures 14 in straps 12, such provision enabling the back rest or cushion to be positioned at different heights on the chair back to suit individual requirements.

In order to prevent the depending portions of the hook 18 from marring the finish of the chair back panels 11, those portions of the hooks that extend downwardly behind the straps 12, may be enclosed in short sections of rubber tubing 19.

The metal straps 17 are formed of thin ribbon-like strips of metal preferably of steel having resiliency and likewise the hooks 18 are formed of thin resilient steel and as a result of this construction the straps and hooks may be flexed toward and away from each other when the hooks 18 are inserted through the apertures 14. Obviously the apertures must be of sufficient size to permit the hooks to be inserted when the pad is applied to the straps in differently adjusted positions.

The sections of rubber tubing 19 may be readily slipped onto and off the hooks after the same have been inserted through the apertures.

The form of back rest or cushion just described is applicable for practically all forms of chairs, seats and benches and the supporting straps 12 may be readily applied to or removed from the seat or chair backs and the back rest or cushion may be easily and quickly adjusted to the desired vertical position upon the supporting straps and with respect to the chair seat.

The construction illustrated in Figs. 3 and 4 is especially applicable for use on the backs of automobile seats and in this construction an apron 20 of suitable fabric or leather is positioned on the front face of the automobile seat back 21.

The upper portion of this apron overlies the upper edge of the seat back and the upper end of said apron is extended down a short distance behind the upper portion of the seat back 21.

By means of snap fasteners that include studs 22 seated in the upper portion of the automobile seat back and sockets 23 in the upper portion of the apron 20, said apron may be detachably secured to the upper portion of the seat back.

Seated in the apron adjacent the sockets 23 are the stud members 24 of snap fasteners and which stud members are adapted to engage in socket members 25 that are seated in the upper portions of straps 26. These straps may be formed of fabric or leather and they extend over the upper portion of the apron 20 and thence downwardly on the face of the apron.

Suitably secured to the lower ends of straps 26, is a horizontally disposed back rest or cushion 27, which may be of any desired construction.

The construction just described enables the upper portion of the apron 20 to be readily secured to or detached from the upper portion of the automobile seat back and by providing a number of socket members 25 in the upper portion of each strap 26, the straps may be adjusted vertically and then secured to the stud members 24 so as to maintain the back rest or cushion at the desired elevation with respect to the cushion of the automobile seat.

That portion of the apron 20 that overlies the upper end of the seat back 21 is provided at its sides with extension flaps 28 and seated in the outer end portions of said extensions are the stud and socket members 29 of an ordinary snap fastener.

When the back rest or cushion for the automobile seat back is not in use and it is desired to pack the same for storage or transportation, the sockets 23 are disengaged from the studs 22 and the back rest or cushion 27 and the straps 26 are now rolled up within the apron 20, after which the extensions 28 are folded over onto each other so as to close the ends of the rolled package and said extensions are secured to each other by the engagement of the members 29 of the snap fastener.

In the modified construction illustrated in Fig. 5, the upper portions of flexible straps 26ª that carry the back rest or cushion, are provided with metal plates 30 having slots 31.

Secured to the upper rear portion of the automobile seat back 21 are studs 32 upon which are mounted for rotation small heads 33, which latter, after being inserted through the openings in plates 31, are turned at right angles thereto so as to securely hold the straps on the studs 32. This arrangement enables the back rest or cushion to be adjusted to the desired vertical position upon the automobile seat back.

The sections of rubber tubing 19 placed on the depending portions of the hooks 18, function to prevent marring or scratching of the seat back to which the straps 12 are applied and further, these tubing sections act to prevent the hooks from being disengaged from the apertures 14 in the event that the occupant of the seat rises therefrom and tends to move the back rest or cushion 17 upwardly during such movement.

In the construction illustrated in Fig. 6, a receptacle 34 is positioned in the upper rear portion of the motor vehicle seat back, said receptacle having a hinged door or panel 35 and the space within said receptacle is adapted to receive the back rest or cushion 27 and associated parts when the same are rolled together.

As a result of this construction, the back rest or cushion may be conveniently stored in an out-of-the-way position while not in use.

In the modified construction illustrated in Figs. 7, 8 and 9, the back rest or cushion is built into and forms a part of a motor vehicle seat back such as 36. In this construction 37 designates the seat back panel, 38 the conventional springs and 39 the fabric or leather cover of the back.

Extending transversely of the seat back a short distance above the seat 40, are two or more rows of springs 41 that are substantially longer or higher than the springs 38 and overlying the respective pairs of these longer springs 41 are side bands 42 of heavy tape or fabric.

Overlying these tape or fabric bands is a pad or layer 43 of rubber treated curled hair and overlying the same, is a layer or pad 44 of flexible fibrous material such as felt.

The fabric or leather covering 39 for the seat back overlies the pad 44.

In some instances the arrangement of the pads 43 and 44 may be reversed with the felt pad 44 resting on the flexible bands 42 and with the pad of rubber treated hair or the like disposed between the felt pad and the covering member 39.

Thus a permanent back rest or pad is formed on the seat back so as to cushion and comfortably support the back of the occupant of the seat.

In the modified construction illustrated in Fig. 10, and which is designed to be adjustably applied to supporting straps on the backs of chairs and other seats, the body 45 of the back rest is formed of sponge rubber approximately half round in cross section and this entire body is enclosed in covering 46 of rubberized fabric or the like and which latter may be vulcanized directly to the body 45.

The hooks 47 that are used for detachably connecting the back rest to the chair or other seat, have their inner portions embedded in the back rest between the rear portion of the body 45 and covering member 46 and the embedded portions of said hooks may be vulcanized directly to the body 45.

The modified construction illustrated in Fig. 11 and which is intended for use on chairs or the like comprises a back panel 48, to which the attaching hooks 49 are secured and arranged on the front face of said panel is a transversely disposed core 50, preferably of sponge rubber and which is approximately half round in cross section. Overlying this core is a pad 51 of resilient fibrous material such as felt and overlying this layer of felt, is a covering 52 of fabric, leather or the like.

My invention contemplates the association of a back rest or cushion with a seat back, said back rest or cushion being disposed transversely on the front face of the seat back a short distance above the lower end thereof and said cushion may be built into the seat back as an integral part thereof or separately formed so as to be detachably and adjustably applied to the front face of the seat back.

Thus it will be seen that I have provided a seat back rest or cushion that is relatively simple in construction, inexpensive of manufacture and very effective in performing the functions for which it is intended.

The back rest or cushion may be readily adjusted to the desired position upon the seat back and the means utilized for mounting the back rest or cushion on the seat back is capable of being easily and quickly applied to or removed from said seat back.

It will be understood that minor changes in the size, form and construction of the various parts of my improved adjustable seat back cushion may be made and substituted for those herein shown and described without departing from the spirit of my invention, the scope of which is set forth in the appended claims.

I claim as my invention:

1. An adjustable seat back cushion, comprising a pair of resilient straps having their upper portions bent to form hooks for engagement over the back of a chair or seat, the depending front portions of said straps being provided with apertures, a back rest and hooks of resilient material secured to and depending from the upper portion of said back rest, which hooks are adapted to be inserted through the apertures in said straps and to extend downwardly a substantial distance behind said straps.

2. An adjustable seat back cushion, comprising a pair of straps having their upper portions bent to form hooks for engagement over the back of a chair or seat, said straps being provided with apertures, a back rest, hooks secured to and depending from the upper portion of said back rest, which hooks are adapted to be inserted through the apertures in said straps and to extend downwardly a substantial distance behind said straps and protective cushioning members of flexible material removably positioned on the depending portions of the hooks that are carried by said back rest.

FLORENCE L. GAILEY.